（12） United States Patent
Moore

(10) Patent No.: US 6,494,028 B2
(45) Date of Patent: Dec. 17, 2002

(54) DECK LIFT APPARATUS FOR RIDING MOWER

(75) Inventor: Jeffrey J. Moore, Beatrice, NE (US)

(73) Assignee: White Consolidated Industries, Inc., Cleveland, OH (US)

( * ) Notice: Subject to any disclaimer, the term of this patent is extended or adjusted under 35 U.S.C. 154(b) by 0 days.

(21) Appl. No.: 09/907,367

(22) Filed: Jul. 17, 2001

(65) Prior Publication Data

US 2002/0011059 A1 Jan. 31, 2002

Related U.S. Application Data

(60) Provisional application No. 60/219,520, filed on Jul. 20, 2000.

(51) Int. Cl.[7] .............................................. A01D 34/64
(52) U.S. Cl. ............................. 56/17.1; 56/208; 56/15.8
(58) Field of Search ........................ 56/1, 2, 10.8, 14.7, 56/14.8, 16.7, 17.1, 17.5, 15.1, 15.6, 15.8, 208, 210, 217, DIG. 22

(56) References Cited

U.S. PATENT DOCUMENTS 4,869,057 A * 9/1989 Siegrist ...................... 56/15.8
5,138,825 A    8/1992 Trefz et al.
5,351,467 A   10/1994 Trefz et al.
5,816,033 A   10/1998 Busboom et al.
5,946,893 A *  9/1999 Gordon ....................... 56/15.7
5,956,932 A *  9/1999 Schmidt ...................... 56/15.6
6,244,025 B1 * 6/2001 Ferris et al. ................. 56/15.8

* cited by examiner

Primary Examiner—Robert E. Pezzuto
(74) Attorney, Agent, or Firm—Pearne & Gordon LLP

(57) ABSTRACT

An apparatus for lifting a deck of a vehicle, such as a lawn mower, by a foot actuated deck lift mechanism. The device includes a lift lever pivotally coupled to a frame and having a pin movably attached thereto. A lift linkage has a first end pivotally coupled to the lift lever and a second end fixedly secured on a front shaft. A connecting linkage pivotally couples the front shaft to a rear shaft. Both the front and rear shafts are rotatably coupled to the frame. The lift lever has a first end fixedly secured to the front shaft and a second free end for operation with the operator's foot. The deck is attached to the deck lift mechanism. A foot actuated deck lift mechanism, depressed by the operator's foot, and simultaneously causes the deck to rise and the lift lever to radially pivot. A pin attached to the lift lever rides atop adjustment plates. When the lift lever has pivoted a preset amount, an opening provided in the adjustment plates receives the pin. The pin then locks the deck at a height suitable for transporting the vehicle.

18 Claims, 5 Drawing Sheets

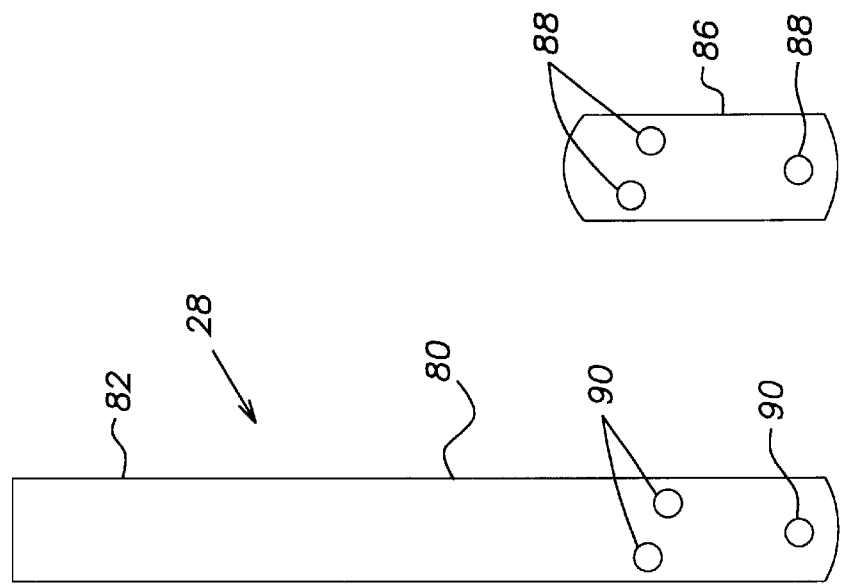
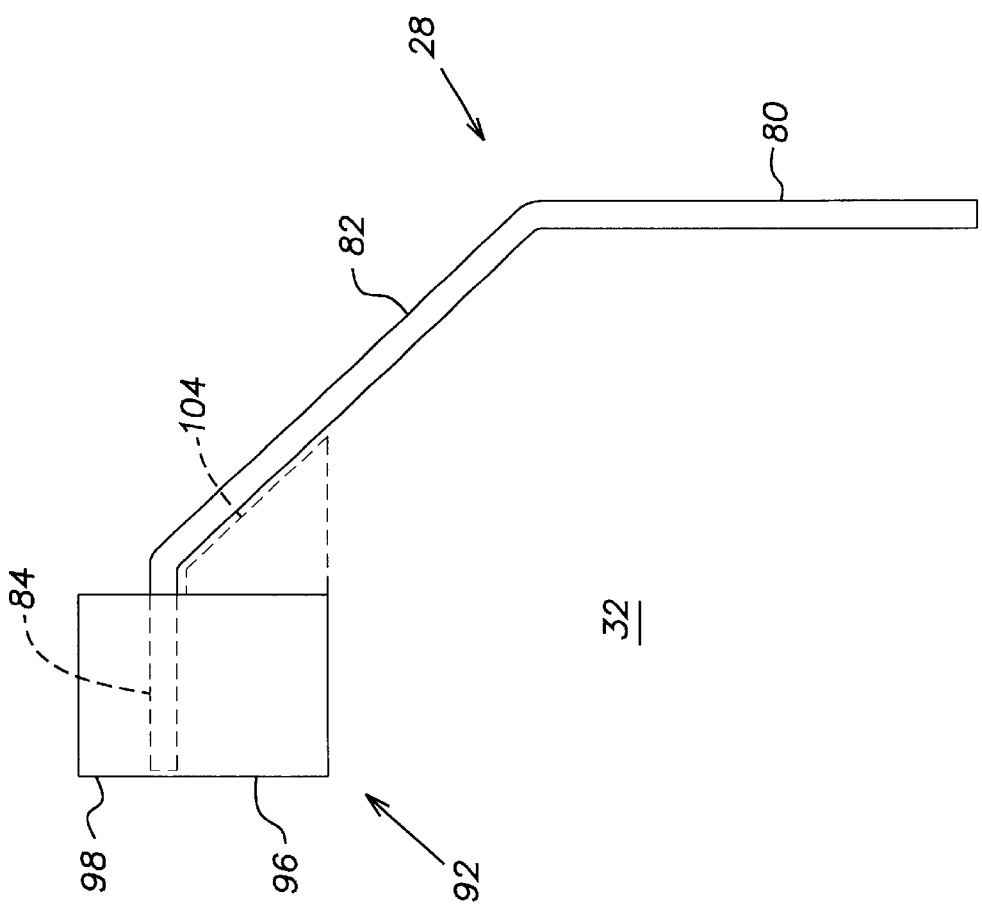

DECK LIFT APPARATUS FOR RIDING MOWER

This application claims the benefit of U.S. Provisional Patent Application Serial No. 60/219,520 filed Jul. 20, 2000.

BACKGROUND OF THE INVENTION

This invention relates generally to a device for lifting a mower deck suspended from a riding mower, and more specifically, to a foot actuated deck lift mechanism for lifting a mower deck automatically from a cutting position to a transport position.

DESCRIPTION OF THE RELATED ART

There are a number of known devices for lifting a mower deck on a riding mower to a transport position. These devices typically include a hand actuated lift lever. U.S. Pat. No. 5,816,033 to Busboom et al. discloses a riding mower having an improved mower deck height control mechanism including an elongated deck height control lever pivotally movable from a lower position with respect to the frame means, to an upper position wherein, the mower deck is in its uppermost transit position. These types of deck lift arrangements require an operator to remove a hand from the drive controls or stop the mower to raise the deck to the transport position. Additionally, hand adjustment lift levers can require considerable force to raise a mower deck, particularly larger decks.

In U.S. Pat. No. 5,138,825 to Trefz et al., a pedal operating lifting system is provided for replacing conventional hand operating levers. The pedal also includes a locking mechanism located on the pedal mechanism for locking the deck in the uppermost position. In U.S. Pat. No. 5,351,467 to Trefz et al, a pedal operating lifting system is provided with unlimited adjustability within a range established by the maximum and minimum deck mower heights. The '825 and '467 patents disclose a pedal operated deck lifting system but do not include the advantages of the system disclosed by the present invention.

Accordingly, there is a need in the art for a mower deck lift mechanism that may be operated without the sole use of an operator's hands. Furthermore, there is a need for a mower deck lift assembly that may be easily attachable as an after market device addition to a riding mower, as well as a standard feature on a stock mower.

SUMMARY OF THE INVENTION

This invention provides a foot actuated mower deck lift device to lift a mower deck from a cutting position to a transport position without the sole use of the operator's hands.

More specifically, the invention is directed towards a lift mechanism that is hand and/or foot actuated for lifting a deck attached to a mower, and particularly, a mower deck attached to a riding lawn mower.

The present invention discloses a system that includes the cooperation of a lift handle with a foot pedal increasing mechanical system leverage and reducing the force required by the operator to engage the system. The present invention also can be operated solely by a foot pedal and without the use of the operator's hands. Finally, the present invention includes a locking transport position positively engaged by a lift pin incorporated into the lift lever.

According to the invention, the deck lift mechanism comprises a frame, a lift lever, inner and outer height adjustment plates, lift linkages, a front lift shaft, a rear lift shaft, shaft connecting linkages, and a pedal lever.

In accordance with an embodiment of the invention, the lift lever is pivotally coupled to a frame and has a pin movably attached thereto. A lift linkage has a first end pivotally coupled to the lift lever and a second end fixedly secured on a front shaft. A connecting linkage pivotally couples the front shaft to a rear shaft. Both the front and rear shafts are rotatably coupled to the frame. The pedal lever has a first end fixedly secured to the front shaft and a second free end for operation with the operator's foot.

In accordance with an aspect of this invention, it is desirable to provide a cutting system that permits the operator to change the cutting height while seated using an adjustment pin.

In accordance with another aspect of this invention, it is further desirable to provide a cutting system wherein the operator can raise the mover deck without the use of the operator's hands to a transport position and return the deck to that exact cutting position once the transport is completed.

In accordance with another aspect of this invention, it is further desirable for the lift assembly to be easily attachable as an after market device, in addition to being a standard stock feature.

These and other aspects of this invention are illustrated in the accompanying drawings, and are more fully disclosed in the following specification.

DETAILED DESCRIPTION OF THE DRAWINGS

FIG. 5 is a front view of the pedal lever and pedal;

FIG. 6 is a side view of the pedal lever of FIG. 5; and

FIG. 7 is a side view of a tightening plate.

DETAILED DESCRIPTION OF THE PREFERRED EMBODIMENTS

Figure 1:
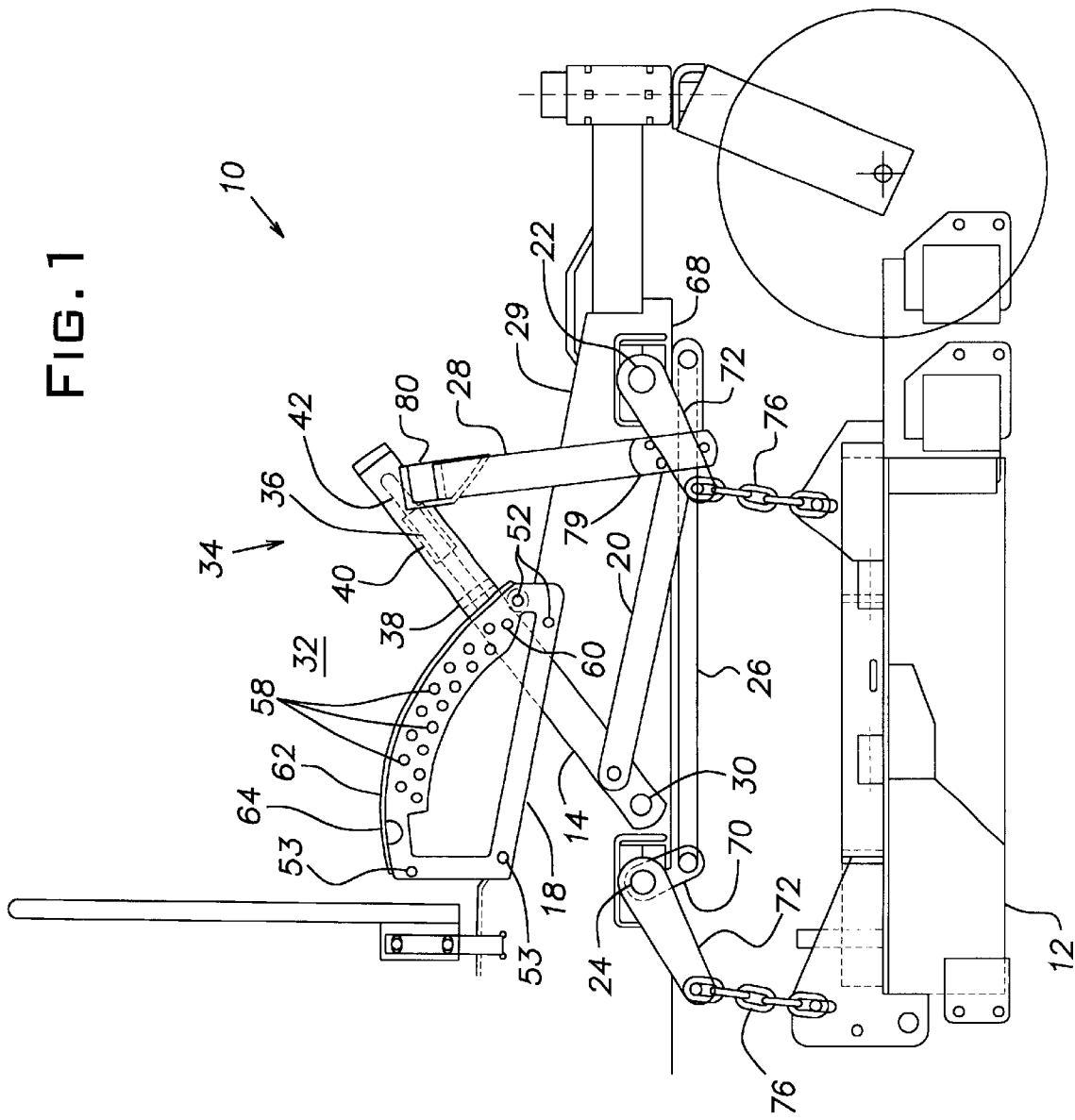
FIG. 1 is an elevation view of a riding mower incorporating the deck lift mechanism in a lowered cutting position.
Figure 2:
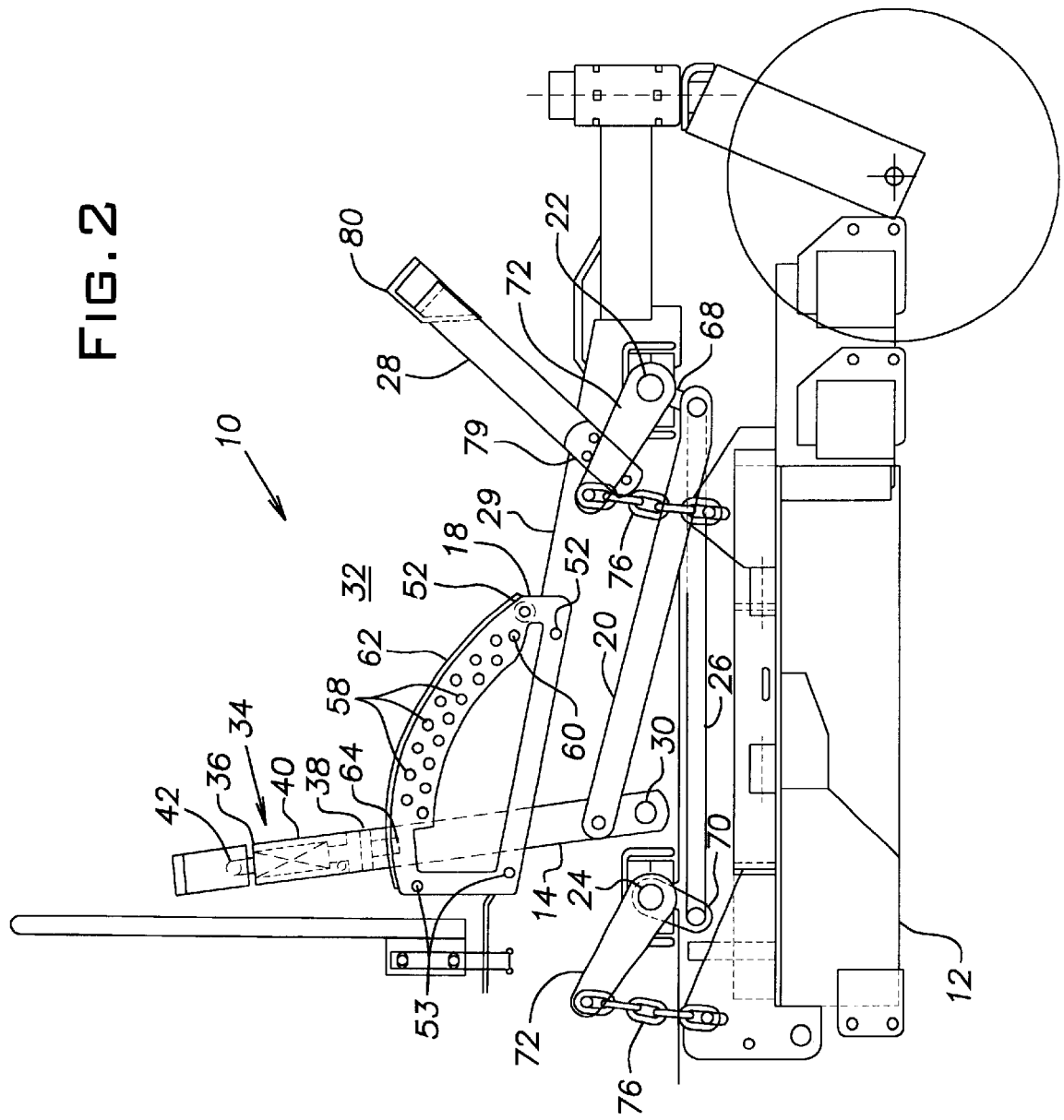
FIG. 2 is an elevation view of a riding mower incorporating the deck lift mechanism in a transport position.

FIGS. 1 and 2 illustrate a foot actuated deck lift mechanism 10 according to the present invention. The deck lift mechanism 10 is shown in its intended operating position, attached to a riding mower, for lifting a mower deck 12 from a cutting position to a transport position. While the remaining components of a riding lawn mower are not shown in the appended drawings, it is expected that those skilled in the art will be intimately familiar with the omitted components, all which are generally conventional.

Referring now to FIG. 1, the deck lift mechanism 10 is shown in a lowered cutting position. FIG. 2 illustrates the deck lift mechanism 10 in a raised transport position. Provided in the deck lift mechanism 10 are a pair of height adjustment plates 16, 18 for securing the deck 12 in the transport position and for positioning the deck at a plurality of particular vertical cutting positions 58.

Figure 3:
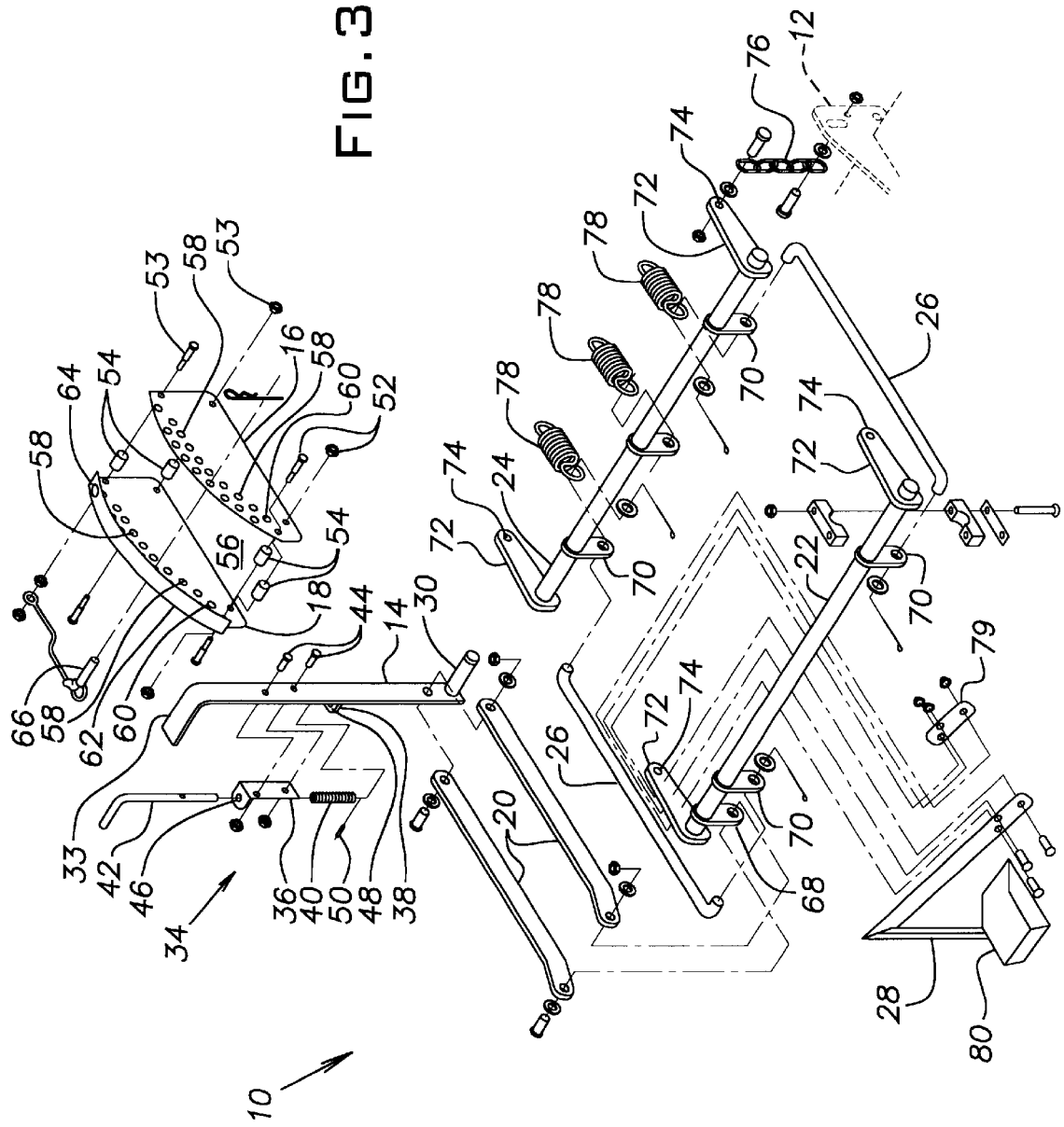
FIG. 3 is an isolated exploded view of the deck lift mechanism.

As shown in FIG. 3, the deck lift mechanism 10 includes a lift lever 14, inner and outer height adjustment plates 16, 18, lift linkages 20, a front lift shaft 22, a rear lift shaft 24, shaft connecting linkages 26, and a pedal lever 28.

Preferably, the deck lift mechanism 10 is actuated solely by an operator's foot using pedal lever 28 to raise the mower deck 12 to a transport position. Alternatively, the deck lift mechanism 10 may be raised to the transport position by the use of an operator's hand using lift lever 14, or by the use of an operator's foot using pedal lever 28 assisting the hand using lift lever 14.

The lift lever 14 is carried on the frame 29 of the vehicle and has an upper end positioned for engagement with the operator's right hand and a lower end pivotally coupled with the frame 29. The lower end provides a peg member 30 formed integral with the lift lever 14. The peg member 30 is pivotally received by an opening formed in the vehicle frame 29. The peg 30 defines the axis about which the lift lever 14 pivots. The upper end angles into the operator's control area 32 to provide a handle for placement of the operator's hand.

As shown in FIG. 3, and illustrated by hidden lines in FIGS. 1 and 2, a spring assembly 34 is attached to the lift lever 14 between the upper and lower ends. The spring assembly 34 includes a pair of guides 36, 38, a spring 40 and a lift pin 42. The upper guide 36 is generally shaped as an inverted L with a body portion and a top portion. The body portion of the upper guide 36, is fixedly secured to the lift lever 14 by nut and bolt assemblies 44. The lower guide 38 is welded to the lift lever at the bottom of the upper guide 36. The spring 40 preferably is a compression spring and is axially positioned between, and restricted by, the guides 36, 38. The lift pin 42 is generally shaped as an inverted L. The upper end of the lift pin 42 is spaced at a distance from the lift lever handle 33 such that the operator's fingers can grasp the lift pin 42 while maintaining their palm on top of the handle 33. The lower end of the lift pin 42 slidably extends through coaxially aligned openings 46, 48 formed in the top portion of the upper guide 46 and in the lower guide 48, and through the inside diameter of the spring 40. A pin 50 is received in an aperature 51 in the lift pin 42 between the lower guide 38 and the bottom of the spring 40. The pin 50 is longer than the outside diameter of the spring 40 and, therefore, carries the spring 40 upwards when the lift pin 42 is lifted upwards thereby compressing the spring 40 between the pin 50 and the top portion of the upper guide 36.

As shown in FIG. 3, the preferred embodiment also provides a pair of height adjustment plates 16, 18 for securing the deck 12 in a transport position and for positioning the deck at a plurality of particular vertical cutting positions. The inner adjustment plate 16 is welded to the frame 29. The outer adjustment plate 18 is fixedly attached to the inner adjustment plate 16 by front and rear nut, spacer and bolt assemblies 52, 53. The spacers 54 maintain the adjustment plates 16, 18 a fixed distance apart to provide a channel 56 between the adjustment plates 16, 18. Both adjustment plates 16, 18, have two rows of radially spaced apart height adjustment openings 58 at fixed intervals which provide the variety of cutting positions. The openings 58 in the adjustment plates 16, 18 coaxially align and are positioned between the front and rear nut, spacer and bolt assemblies 52, 53. The forward most opening 60 provides the lowest cutting position and each subsequent opening incrementally increases the cutting height.

Referring again to FIG. 3, the lift lever 14 extends through the channel 56 formed by the adjustment plates 16, 18 with the peg member 30 below, and the handle 33 above the adjustment plates 16, 18. The lift lever 14 radially moves along the channel 56 and is configured between the front and rear nut, spacer and bolt assemblies 52, 53.

As shown in FIGS. 1 and 2, the outer adjustment plate 18 is provided with an arcuate top rail 62, uniformly distant from the peg member 30 upon which the bottom end of the lift pin 42 slides. A transport opening 64 for setting the deck into the transport position is formed by a contiguous recess, which extends through the top rail 62 into the outer adjustment plate 18. The transport opening 64 is located rearward of the height adjustment openings 58.

The lift pin 42 is biased against the top rail 62 by the spring 40. When the lift pin 42 is positioned over the transport opening 64, the spring 40 urges the lift pin 42 into the transport opening 64 thereby securing the deck 12 into the transport position. Preferably, the deck 12 is raised to a six-inch cutting height when in the transport position.

A height adjustment pin 66, shown in FIG. 3, provides intermediate positioning of the deck 12. The deck height is selected by inserting the height adjustment pin 66 through a coaxially aligned pair of height adjustment openings 58 to form a crossbeam through the channel. The lift lever 14 contacts and rests upon the height adjustment pin 66 under the force of gravity when setting the cutting height. For storage purposes and so that it does not get misplaced, the height adjustment pin 66 is attached to the outer height adjustment plate 18 by a wire, rope or chain.

A pair of laterally spaced lift linkages 20 include first ends pivotally coupled with the lift lever 14, and second ends pivotally coupled with integral connection lever 68 fixedly provided on the front lift shaft 22.

The front and rear lift shafts 22, 24 are rotatably coupled to the frame 29 in any known manner. The lift shafts 22, 24 are each provided with integral connection levers 70. A pair of connecting linkages 26 are pivotally secured to the levers 70 on the front lift shaft 22 and the rear lift shaft 24 to form a parallel linkage, thereby pivotally coupling the front lift shaft 22 to the rear lift shaft 24, such that rotation of the front lift shaft 22 is equally transmitted to the rear lift shaft 24.

A pair of deck lift levers 72 are integrally provided on the front and rear lift shafts 22, 24. An opening 74 is provided in an outer end of each of the deck lift levers 72. Chains 76 having an upper end attached to the openings 74 and a lower end attached to the deck 12, support the weight of the deck 12.

Springs 78, preferably of the tension type, include a first end attached to the levers 70 on the rear lift shaft 24 and a second end attached to the frame 29. The springs bias the rear lift shaft 24 towards the direction of rotation in which the deck 12 is lifted. The aggregate force of the springs 78 offsets a portion of the weight of the deck 12 to assist the operator when raising the deck 12. Additional levers and springs can be provided to increase the biasing force.

Figure 4:
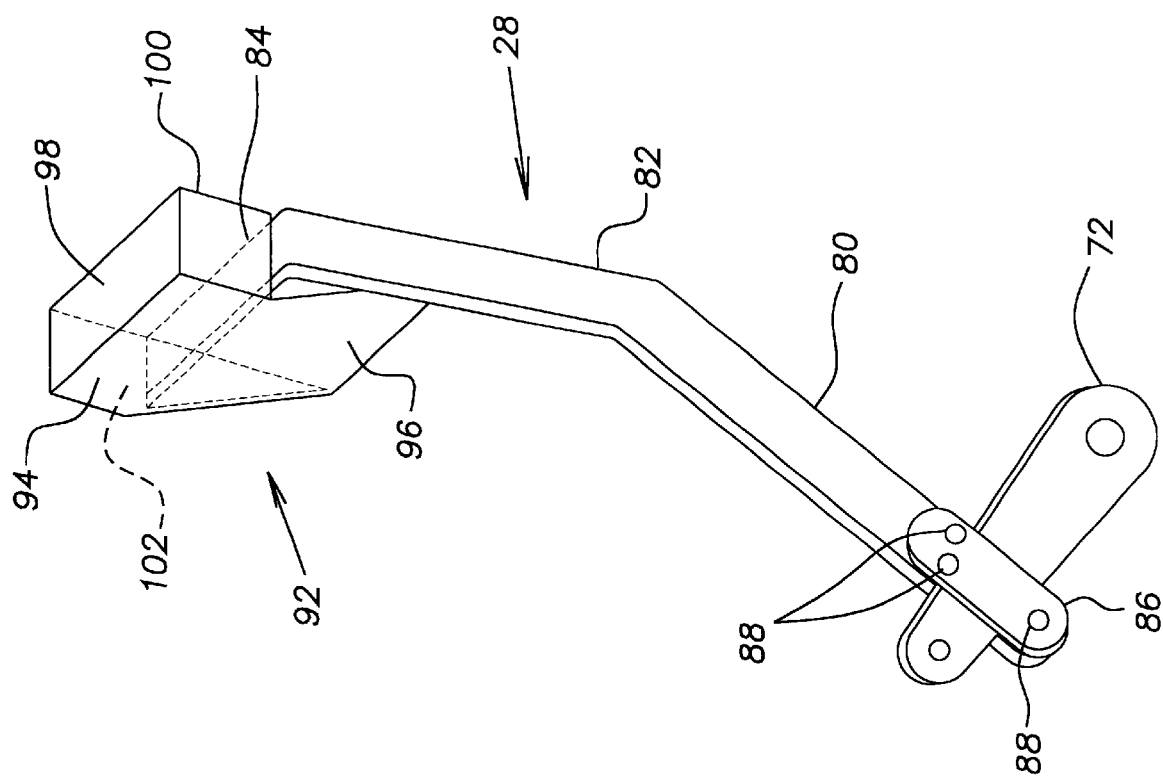
FIG. 4 is a perspective view of a pedal lever connected to a pedal and a deck lift lever.

As shown in FIGS. 4 and 5, the pedal lever 28 has a lower portion 80, a middle portion 82 and an upper portion 84. The middle portion 82 preferably angles towards the control area 32 from the lower portion 80 by forty-five degrees and the upper portion 84 preferably angles toward the control area 32 from the middle portion 82 by forty-five degrees for ergonomic operation by the operator's right foot.

The lower portion 80 is removably secured to the right front deck lift lever 72. Particularly, a tightening plate 86 cooperates with the lower portion 80 to sandwich an intermediate section of the pedal lever 28 therebetween. Preferably, two groups of three openings 88, 90 are provided, one group 88 in the tightening plate 86 and the other group 90 in the deck lift lever 72 as illustrated in FIGS. 4, 6 and 7. The groups of openings 88, 90 coaxially align for receiving nut and bolt assemblies. Two sets of the coaxially aligned openings are positioned above, and one set of the openings below, the deck lift lever 72. Each group of the openings 88, 90 are orientated as vertexes of an obtuse triangle. Each nut and bolt assembly is disposed adjacent the circumferential edge of the deck lift lever 72, and preferably is connected thereto.

As shown in FIGS. 4 and 5, a pedal 92 is fixedly secured to an inward facing edge of the upper portion 84. The pedal 92 is formed of a unitary piece of metal and includes upper and lower inwardly facing engagement surfaces 94, 96, and a top 98, and left and right sides 100, 102. The upper engagement surface 94 is rectangular. The lower engagement surface preferably is trapezoidal wherein an edge 104 of the lower surface is disposed adjacent to the middle portion 82 of the pedal lever 28. The engagement surfaces 94, 96 slightly angle together to form an outwardly facing obtuse angle. The inward surface of both the upper and lower engagement surfaces 94, 96 can be engaged with the operator's foot for operation of the deck lift mechanism 10. Preferably, the inward surfaces have attached an abrasive material, or high friction material such as rubber, to reduce slippage of the operator's foot. The top 98 and left and right sides 100, 102 perpendicularly extend outwardly form the upper engagement surface 94 to partially enclose the pedal lever upper portion 84.

The operation of the preferred embodiment will now be discussed. To place the deck 12 in the transport position, the operator places their right foot on the pedal 92 wholly retaining their hands on the drive controls and remaining seated on the vehicle seat. As the operator depresses the pedal lever 28 with their foot, the foot and rear lift shafts 22, 24 rotate causing the outer end of the deck lift levers 72 to radially rise upwards. The deck 12, carried by the chains 76 attached to the deck lift levers 72, is lifted upwards. Alternatively, the deck can be placed in the transport position by the operator moving the lift lever 14 backwards, or using a combination of the lift lever 14 and the pedal lever 28.

Simultaneously, upon engagement of the pedal lever, the rotating front lift shaft 22 transmits movement to the lift lever 14 through the pair of lift linkages 20. As the lift lever 14 pivots the lift pin 42, carried by the lift lever 14, radially moves rearward sliding atop the top rail 62 towards the transport opening 64 provided in the top rail 62. Sufficiently depressing the pedal lever 28 moves the lift lever 14, which carries the lift pin 42 where the potential energy of the spring 40 forces the biased lift pin 42 into the transport opening 64. The lift pin 42 sufficiently extends into the transport opening 64 so as not to be inadvertently removed or jostled therefrom, yet require minimal lifting to be removed from the transport opening 64. When fully inserted into the transport opening 64, the lift pin 42 extends between ⅛ and 1½ inches therein, and preferably between ¼ and ¾ inch. The lift pin 42 fits within the transport opening 64 with little lateral play. When the lift pin 42 is within the transport opening 64, the deck 12 is in the transport position corresponding to about a six-inch cutting height.

The deck can alternatively be placed in the transport position by the operator grasping the handle 33 with their right hand and pulling the lift lever 14 backwards, until the lift pin 42 reaches the transport opening. Similarly, the operator can simultaneously pull the handle 33 and depress the pedal lever 28 to place the deck into the transport position, which supports the deck at the desired cutting height.

To remove the deck 12 from the transport position to a cutting position, the height adjustment pin 66 is inserted into a pair of coaxially aligned openings 58 that correspond to the desired cutting height. Then, the operator places their palm on the handle 33 with fingers extending downward grasping the lift pin 42. The operator applies moderate pressure to the pedal 92 and/or handle 33 to offset the weight of the deck 12, thereby, reducing the force required to remove the lift pin 42 from the transport opening 64. The operator closes their hand forcing the lift pin 42 upwards and out of the transport opening 64. The lift lever 14 pivotally rotates forward under the weight of the deck 12, partially offset by the operator, until contacting the height adjustment pin 66, and consequently setting or re-setting the cutting deck position.

The cutting deck may be vertically adjusted for a plurality of cutting height settings. If the cutting deck is locked in its uppermost transport position, it may then be returned to the pre-selected cutting height set by the height adjustment pin once removed it is from the transport position.

Although the invention has been shown and described with respect to certain embodiments, it is obvious that equivalent alterations and modifications will occur to others skilled in the art upon reading and understanding of the specification. The present invention includes all such equivalent alterations and modifications, and is limited only by the scope of the claims.

What is claimed is:

1. In a riding lawn mower having a cutting deck, apparatus for lifting the cutting deck comprising:
   a frame;
   a lift lever pivotally mounted to a portion of said frame having an upper and a lower end;
   inner and outer deck height adjustment plates, said lift lever extending through a channel formed by said adjustment plates;
   front and rear lift shafts rotatably coupled to said frame, each shaft having connection levers and deck lift levers fixed thereto;
   a pair of lift linkages connected to said lift lever at one end and to said connection levers on said front lift shaft at the other end;
   a pair of shaft connecting linkages for connecting said front shaft to said rear shaft;
   a pedal lever attached to said connection levers on said front lift shaft for operating said deck lift mechanism and suitable for engagement by an operator's foot;
   means for attaching said cutting deck to said deck lift levers on said front and rear shafts; and
   whereby, upon depression of said pedal lever by the operator's foot, said connection levers on said front shaft translate rotational movement to said shaft connecting linkages and to said lift linkages effecting vertical movement of said cutting deck and forward movement of said lift lever into a transport position.

2. Apparatus for lifting the cutting deck as set forth in claim 1, including a spring biased pin on said lift lever adapted to engage a recess in one of said plates to lock said cutting deck in said transport position.

3. Apparatus for lifting the cutting deck as set forth in claim 1, wherein said upper end of said lift lever contains a handle positioned for engagement with an operator's hand and said lower end is pivotally coupled with said frame at a pivot pin.

4. Apparatus for lifting the cutting deck as set forth in claim 3, wherein a spring activated lift pin assembly is attached to the lift lever below said upper end positioned for engagement with an operator's hand, said spring activated lift pin assembly comprising a pair of guides, a spring and a lift pin.

5. Apparatus for lifting the cutting deck as set forth in claim 4, wherein said lift pin is generally shaped as an inverted L with a body portion and a top portion, said lift pin spaced at a distance from said lift lever handle such that an operator's fingers can grasp the top portion of said lift pin while maintaining their palm on top of the lift lever handle.

6. Apparatus for lifting the cutting deck as set forth in claim 4, wherein said spring is a compression spring.

7. Apparatus for lifting the cutting deck as set forth in claim 1, wherein said inner adjustment plate is welded to the frame and said outer adjustment plate is fixedly attached to said inner adjustment plate.

8. Apparatus for lifting the cutting deck as set forth in claim 7, wherein spacers maintain the adjustment plates a fixed distance apart to provide said channel between the adjustment plates, each adjustment plates having two rows of radially spaced apart height adjustment openings at fixed intervals which provide a variety of cutting positions, said openings in the adjustment plates coaxially align and are positioned between the front and rear nut, spacer and bolt assemblies, the forward most opening providing the lowest cutting position and each subsequent opening incrementally increases the cutting height.

9. Apparatus for lifting the cutting deck as set forth in claim 8, wherein a height adjustment pin is inserted through a pair of said coaxially aligned height adjustment openings to form a crossbeam through said channel, said lift lever contacting and resting on said crossbeam setting the height of said cutting deck.

10. Apparatus for lifting the cutting deck as set forth in claim 5, wherein the outer adjustment plate is provided with an arcuate top rail pin upon which the top portion of said lift pin slides uniformly distant from said pivot, a transport opening for setting the deck into the transport position formed by a contiguous recess extending through the arcuate top rail into the outer adjustment plate, said bottom portion of said lift pin is positioned in said contiguous recess locking said cutting deck while in the transport position.

11. Apparatus for lifting the cutting deck as set forth in claim 1, wherein said means for attaching said cutting deck to said deck lift levers are chains.

12. Apparatus for lifting the cutting deck as set forth in claim 1, wherein a set of springs are provided between the levers on the rear lift shaft and the frame.

13. Apparatus for lifting the cutting deck as set forth in claim 1, wherein said pedal lever comprises a lower portion, a middle portion and an upper portion, said middle portion angling toward s an operator control area from the lower portion by forty-five degrees and the upper portion angling toward the control area from the middle portion by forty-five degree s for ergonomic operation by the operator.

14. Apparatus for lifting the cutting deck as set forth in claim 13, wherein a tightening plate cooperates with the lower portion to sandwich an intermediate section of the pedal lever therebetween.

15. Apparatus for lifting the cutting deck as set forth in claim 13, wherein said pedal level includes a pedal on said upper portion of said pedal lever, said pedal formed of a unitary piece of metal, including upper and lower inwardly facing engagement surfaces.

16. Apparatus for lifting the cutting deck as set forth in claim 15, wherein said inwardly facing surfaces of both the upper and lower engagement surfaces can be engaged with the operator's foot for operation of the deck lift mechanism.

17. Apparatus for lifting the cutting deck as set forth in claim 16, wherein said inward surfaces are provided with an abrasive material.

18. Apparatus for lifting the cutting deck as set forth in claim 17, wherein said abrasive material is a rubber compound.

\* \* \* \* \*

UNITED STATES PATENT AND TRADEMARK OFFICE
CERTIFICATE OF CORRECTION

PATENT NO. : 6,494,028 B2
DATED : December 17, 2002
INVENTOR(S) : Jeffrey J. Moore It is certified that error appears in the above-identified patent and that said Letters Patent is hereby corrected as shown below:

<u>Column 8,</u>
Line 15, please delete "degree s", and insert therefor -- degrees --.

Signed and Sealed this

Fourth Day of March, 2003

JAMES E. ROGAN
*Director of the United States Patent and Trademark Office*